United States Patent [19]

Amberger et al.

[11] Patent Number: 5,106,671
[45] Date of Patent: Apr. 21, 1992

[54] TRANSPARENT ANTI-REFLECTIVE COATING

[75] Inventors: Charles J. Amberger, Northville; Hulya Demiryont, Farmington Hills; Kenneth E. Nietering, Dearborn, all of Mich.

[73] Assignee: Ford Motor Company, Dearborn, Mich.

[21] Appl. No.: 624,820

[22] Filed: Dec. 10, 1990

[51] Int. Cl.⁵ .............................................. B32B 17/06
[52] U.S. Cl. .................................... 428/215; 428/213; 428/336; 428/426; 428/428; 428/432; 428/446; 428/913
[58] Field of Search ............... 428/426, 428, 432, 446, 428/336, 213, 215; 52/204

[56] References Cited

U.S. PATENT DOCUMENTS

| | | | |
|---|---|---|---|
| 3,990,784 | 11/1976 | Gelber | 356/166 |
| 4,070,097 | 1/1978 | Gelber | 350/165 |
| 4,100,330 | 7/1978 | Donley | 428/448 |
| 4,144,684 | 3/1979 | Kirkbride et al. | 52/204 |
| 4,185,894 | 1/1980 | Hilton et al. | 350/338 |
| 4,188,444 | 2/1980 | Landau | 428/428 |
| 4,497,539 | 2/1985 | Sakurai et al. | 350/164 |
| 4,546,050 | 10/1985 | Amberger et al. | 428/630 |
| 4,634,684 | 1/1987 | Dumbaugh, Jr. | 501/69 |
| 4,689,873 | 9/1987 | Kramer | 437/2 |
| 4,737,018 | 4/1988 | Iwashita et al. | 350/339 R |
| 4,765,729 | 8/1988 | Taniguchi | 351/163 |
| 4,773,964 | 9/1988 | Haond | 156/603 |
| 4,780,334 | 10/1988 | Ackerman | 427/248.1 |
| 4,802,737 | 2/1989 | Denton | 350/166 |
| 4,815,821 | 3/1989 | Nonogaki et al. | 350/164 |
| 4,822,120 | 4/1989 | Fan et al. | 350/1.7 |
| 4,822,748 | 4/1989 | Janesick et al. | 437/3 |
| 4,835,040 | 5/1989 | Callies et al. | 428/428 |
| 4,846,151 | 7/1989 | Simko, Jr. | 126/441 |
| 4,847,157 | 7/1989 | Goodman et al. | 428/426 |

OTHER PUBLICATIONS

Stone et al., *Reflectance, Transmittance and Loss Spectra of Multilayer Si/SiO₂ Thin Film Mirrors and Antireflection Coatings For 1.5 μm*, Applied Optics, vol. 29, No. 4 (Feb. 1, 1990).

Pawlewicz et al., *1315 NM Dielectric Mirror Fabrication By Reactive Sputtering*, presented at Topical Meeting on High Power Laser Optical Components held at Boulder, Colo. in Oct., 1984.

Martin et al., *Optical Coatings for Energy Efficiency and Solar Applications*, Proceedings of the SPIE, vol. 324, pp. 184-190 (Jan. 28-29, 1982).

Pawlewicz et al., *Optical Thin Films—Recent Developments In Reactively Sputtered Optical Thin Films*, Proceedings of the SPIE, vol. 325, pp. 105-112 (Jan. 26-27, 1982).

Pawlewicz et al., *Improved Si-Based Coating Materials for High Power Infrared Lasers* (Nov. 1981).

Primary Examiner—Patrick J. Ryan
Assistant Examiner—Archene Turner
Attorney, Agent, or Firm—Charles H. Ellerbrock; Roger L. May

[57] ABSTRACT

An anti-reflective coating employing silicon as a high refractive index material in a film pair together with silicon dioxide as a low refractive index material is found to be substantially transparent to visible light and to provide good anti-reflectance where the silicon film is ultra-thin, preferably less than about 50 Angstroms and the thickness of the silicon dioxide film is matched to that of the silicon film. Laminated glazing units having such anti-reflective film can be used, for example, even in applications requiring high transmittance of visible light, such as motor vehicle windshields, in view of the substantial transparency of the coating.

13 Claims, 2 Drawing Sheets

TRANSPARENT ANTI-REFLECTIVE COATING

INTRODUCTION

The present invention is directed to an anti-reflective coating which is substantially transparent to visible light wavelengths. The anti-reflective coating of the invention is particularly suitable for use on glazing units, such as automotive and architectural windows.

BACKGROUND OF THE INVENTION

Anti-reflective coatings have been used in various applications for some time. Exemplary applications include lenses, glazing units, mirrors and the like. It is becoming desirable to use anti-reflective coatings on architectural and automotive glazing units, especially on the inside and/or outside surfaces of motor vehicle windshields. A suitable anti-reflective coating on the inside surface of a motor vehicle windshield would facilitate the use of lighter colored instrument panel materials. Without an anti-reflective coating, vision through the windshield might be impaired by light from the upper surface of such lighter colored instrument panel reflecting on the inside surface of the windshield. An anti-reflective coating on the outside of a windshield increases transmitted light intensity and helps meet applicable minimum transparency requirements. Presently, minimum transmittance of visible light for motor vehicle windshields is 70% in the United States and 75% in Europe. Therefore, to be suitable for use in a vehicle windshield or other glazing application, the anti-reflective coating must not reduce the transparency of the glazing unit to an unacceptable degree.

Numerous anti-reflective coatings are known, many of which comprise a film stack in which a first film of relatively high refractive index material is paired with for example, U.S. Pat. No. 4,846,151 to Simko, Jr. suggests that various surfaces of transparent plates used in solar collectors can be coated with an anti-reflective material. Exemplary materials are listed, including multi-layer coatings such as silicon dioxide paired with aluminum oxide or titanium dioxide. Similarly, U.S. Pat. No. 4,822,748 to Janesick et al suggests the use of an anti-reflective coating on glass used in picture frames and the like. Specifically, it suggests the preparation of a triple layer film stack in which a film of titanium oxide is sandwiched between films of silicon dioxide. Other materials, such as zirconium oxide, tantalum oxide and magnesium oxide also are mentioned. The use of silicon monoxide is suggested as an anti-reflective coating for optical parts made of synthetic resin in U.S. Pat. No. 4,497,539 to Sakurai et al. Silicon monoxide also is suggested, as is silicon dioxide, as an anti-reflective layer having high infrared reflectivity and high visible light transmission suitable for use in heat-mirrors in U.S. Pat. No. 4,822,120 to Fan et al. In U.S. Pat. No. 4,815,821 to Nonogaki et al. a light transmitting glass panel is suggested having on its surface a coating consisting of a silicon monoxide layer over a titanium oxide layer. The silicon monoxide layer is said to be intermittently spaced from the titanium dioxide layer by a light absorbing layer of colloidal carbon. A transparent optical article, such as a lens, is suggested in U.S. Pat. No. 4,765,729 to Taniguchi. Silicon dioxide is suggested as a suitable anti-reflective coating for the surface of the article.

The use of an anti-reflective coating on both the inside and the outside of an ophthalmic lens is suggested in U.S. Pat. No. 4,070,097 to Gelber. Each of the two coatings is said to have two layers, a dielectric layer and a metal layer. For the metal layer, suitable materials are said to include nickel, chromium, Inconel and Nichrome (a material comprised essentially of nickel and chromium). The metal layer is said typically to have a thickness ranging from 10 to 40 Angstroms. Various materials, including silicon dioxide, are listed for the dielectric layer. A second U.S. Pat. No. to Gelber, No. 3,990,784, is directed to coated architectural glass having a multi-layer coating on its surface. The coating is said to comprise first and second metal layers spaced from each other by a dielectric layer disposed between them. An additional metal oxide layer is said to be used optionally for anti-reflective purposes. Nickel is mentioned as being a suitable metal together with silicon dioxide as the dielectric layer.

The optical properties of silicon/silicon dioxide multilayer systems are discussed in Stone et al., *Reflectance, Transmittance and Lost Spectra of Multilayer Si/SiO₂ Thin Film Mirrors and Antireflection Coatings For 1.5 μm*, Applied Optics, Vol. 29, No. 4 (1 Feb. 1990). Stone et al. suggest that in the spectral region between 1.0 and 1.6 μm, a useful and easy to handle combination of paired layers is silicon and silica. The paper is directed to the fabrication of multilayer systems. It is noted therein that the greater the difference in the index of refraction of the paired layers, the fewer the number of layers will be needed to obtain a desired level of reflectance. Silicon is noted to have a relatively high index of refraction. The paper states that silicon cannot be used as a material in the film pair for light below about 1.0 μm wavelength, for visible light, for example, due to its high absorption of light in that range. Visible light has a wavelength in the range of about 0.4 to 0.75 μm. Thus, while suggesting that a simple two layer anti-reflection coating can be made using silicon and silicon dioxide, the article clearly teaches that such anti-reflection coating is not suitable for applications requiring transparency to visible light. The article notes that Si/SiO₂ film pairs for high reflectance mirrors and anti-reflection coatings have been deposited by reactive sputtering. The coatings discussed in the paper are said to have been deposited by electron beam evaporation onto glass substrates. The anti-reflection coatings described in the Stone et al. article are said to consist of a layer of silicon about 150 Angstroms thick with a layer of SiO₂ thereover having a thickness selected to yield minimum reflection. A silicon layer of that thickness is substantially opaque to visible light and reflectance percentage is shown in the paper only for light far above the visible wavelength range. For a layer of silicon of that thickness, a SiO₂ layer of about 2800 Angstroms is employed by Stone et al. It is further stated that the minimum reflectance value is not very sensitive to the thickness to the silicon layer over a thickness range between 75 and 200 Angstroms. Even at the low end of this thickness range, however, the layer of silicon would be substantially opaque to the visible light component of ordinary sunlight.

Similar teaching is presented in Pawlewicz et al., *1315 nm Dielectric Mirror Fabrication By Reactive Sputtering* presented at the Topical Meeting on High Power Laser Optical Components held at Boulder, Colo. on Oct. 18–19, 1984. Low levels of light absorption are reported in that paper for five reactively sputtered amorphous optical coating materials, including a Si:H-

/SiO$_2$ film pair. The low absorption was measured for light in the 1.3 μm range and it is taught in the conclusion of the paper that the Si:H material is not useable at visible wavelengths. The same point is made in Pawlewicz et al., *Optical Thin Films-Recent Developments In Reactively Sputtered Optical Thin Films*, Proceedings of the SPIE, Vol. 325, pp. 105-112 (Jan. 26-27, 1982). Table 1 of that paper lists light wavelengths of 1,000 to 9,000 nm (1.0 to 9.0 μm) as the range for which optical coatings of silicon are useful. Thin film coatings of Si$_{1-x}$H$_x$ for reducing light absorption of infrared laser wavelengths 1.06, 1.315 and 2.7 μm are discussed in Pawlewicz et al., *Improved Si-Based Coating Materials for High Power Infrared Lasers* (November, 1981).

The optical properties of Si:H are discussed also in Martin et al., *Optical Coatings for Energy Efficiency and Solar Applications*, Proceeding of the SPIE, Vol. 324, pp. 184-190 (Jan. 28-29, 1982). The effect is discussed of hydrogen content and Si:H bonding on various optical properties at 2 μm, a non-visible wavelength. Multilayer Si:H/SiO$_2$ laser mirrors with reflectance greater than 99% at non-visible wavelengths 1.315, 2.7 and 3.8 μm also are described. The article notes that Si:H/SiO$_2$ multilayer coatings are easily fabricated by sputtering, since only a single Si target is required, with either H$_2$ or O$_2$ being introduced into the sputtering chamber to form Si:H and SiO$_2$ layers, respectively. The high absorption coefficient in the visible region is said to make thin films of Si:H suitable for use in solar cells to absorb solar radiation.

Various glazing product needs would be met by a new anti-reflective coating system which is substantially transparent to visible light and which can be deposited onto a substrate surface by economical and industrially feasible techniques. In addition, certain glazing applications, such as the above mentioned inside surface of a motor vehicle windshield, require relatively hard and durable anti-reflective coating systems. It is an object of the present invention to provide an anti-reflective coating system, or a glazing unit having an anti-reflective coating thereon, which meets one or more of these product needs. Additional features and aspects of the invention will be understood from the following disclosure and description thereof.

SUMMARY OF THE INVENTION

According to a first aspect of the invention, an anti-reflective coating system comprises a film stack having a high index of refraction material paired with a low index of refraction material, specifically, an ultra-thin film of silicon is paired with a thicker film of silicon dioxide. The anti-reflective coatings of the invention are substantially transparent to visible light. This is surprising, since it is well known that silicon exhibits strong absorption in the visible wavelength region. For that reason silicon has not previously been considered suitable for use in anti-reflective coatings on glazing units, that is, applications requiring transparency. Because of its high absorption of visible light, it would not have been thought possible prior to the present invention to use silicon alone or in a film pair with silicon dioxide or other material for an anti-reflective coating which is substantially transparent to visible light. Nevertheless, the present invention employs silicon effectively in a substantially transparent anti-reflective coating system. Specifically, an ultra-thin film of silicon, preferably about 10 Angstroms to about 45 Angstroms thick, is surprisingly found to be able to function effectively as the high refractive index material in a film pair with silicon dioxide if the silicon dioxide is appropriately matched in film thickness to the silicon film. That is, notwithstanding that the thickness of the high refractive index film of silicon is only on the order of about 1/500 the wavelength of visible light, it is found able to operate together with a film of silicon dioxide of appropriate thickness as a high refractive index/low refractive index film pair.

According to another aspect of the present invention, a glazing unit is provided having on one or more surfaces an anti-reflective coating as described above. The silicon dioxide film, as the exterior film of the film pair, is found to act as a hard protective layer, providing good durability for the anti-reflective coating. Thus, for example, the anti-reflective coating system of the invention functions advantageously in a motor vehicle environment as an anti-reflective coating on a motor vehicle windshield. The anti-reflective coating functions on the inside surface to reduce reflected light from the dashboard. On the outside surface it increases transmittance of visible light to the interior. The silicon and silicon dioxide films can be deposited by sputtering and other methods which are commercially known and economically and industrially feasible. The coating is especially suitable for use on silicon based glass, in which applications especially durable interfacial adhesion is obtained. Additional features and advantages of the invention will be understood by those skilled in the art in view of the foregoing disclosure and the following detailed description of certain preferred embodiments.

BRIEF DESCRIPTION OF THE DRAWINGS

The following detailed description of certain preferred embodiments of the invention will include discussion of the appended drawings in which.

Figure 1:
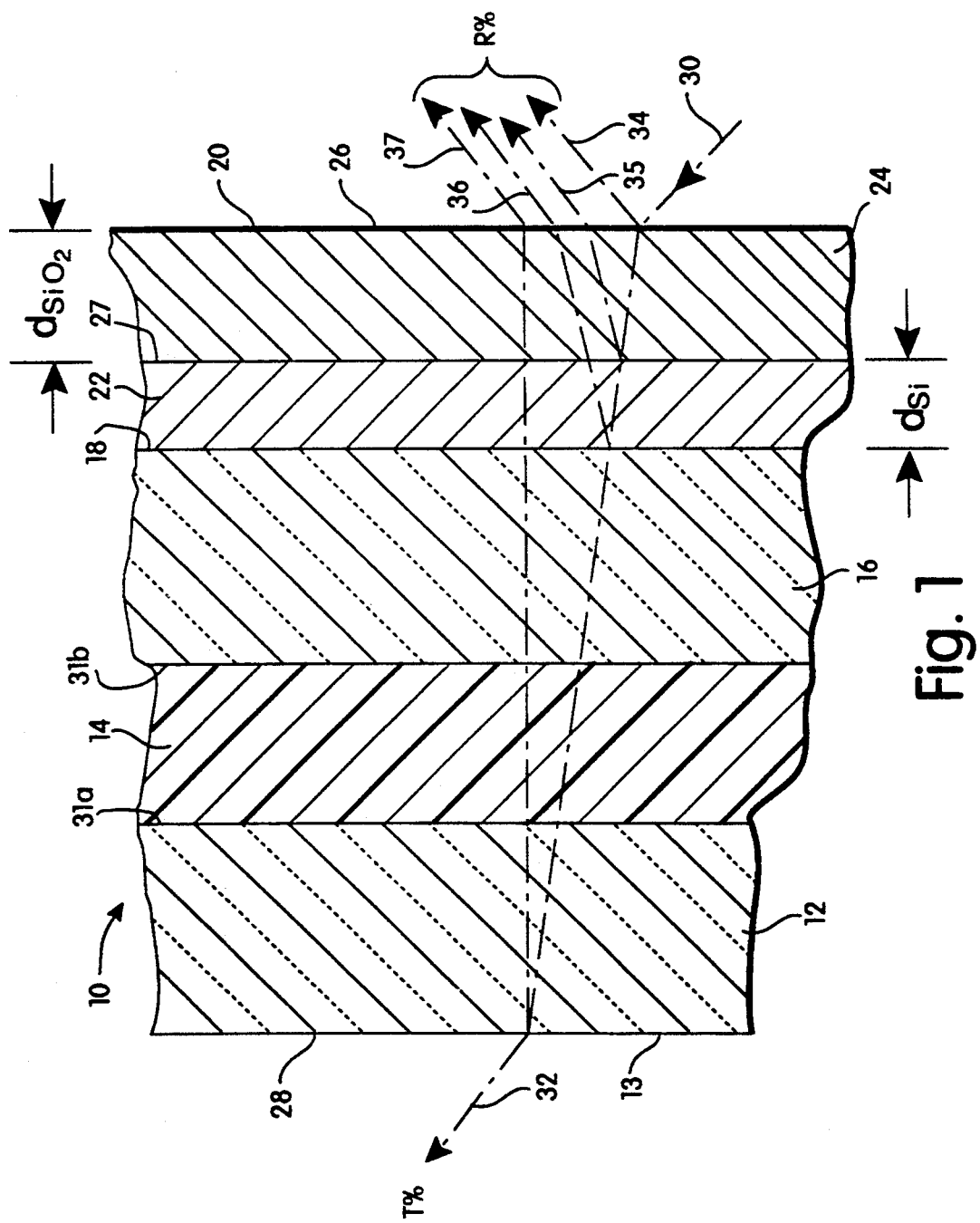
FIG. 1 is a cross-sectional view of a laminated motor vehicle windshield comprising an anti-reflective coating in accordance with a preferred embodiment of the present invention.

It should be understood that features and elements of the embodiments of the invention illustrated in FIG. 1 are not necessarily precisely to scale. The thicknesses of the films of the anti-reflective coating are shown larger than true scale, for example, for ease of illustration and understanding.

DETAILED DESCRIPTION OF PREFERRED EMBODIMENTS

In the light of the present disclosure numerous applications of the present invention will be apparent to those skilled in the art. For purposes of exemplification, the invention is described with reference to certain preferred embodiments comprising a motor vehicle windshield having an anti-reflective coating in accordance with the invention on its inside surface (i.e., the surface exposed to the passenger compartment of the motor vehicle). The anti-reflective coatings of the invention, and windshield glazing units having the same, provide several significant advantages. The glass currently used in motor vehicle windshields is typically a silicon based composition. The silicon based anti-reflective coatings of the invention are found to have good interfacial adhesion with a silicon based glass substrate. In addition, the silicon dioxide film forming the exposed surface of the glazing unit provides a hard and durable surface well adapted to the use environment experienced by a motor vehicle windshield.

It should be understood that reference to the anti-reflective coating of the invention and to glazing units comprising the same as being substantially transparent to visible light will generally, unless otherwise stated, mean a transmittance value of at least about 50%, and preferably at least about 70%, to meet current federal guidelines for motor vehicle windshields and also product specifications for certain architectural applications. The term visible light is used broadly to mean light anywhere in a wavelength range which is perceptible to a human observer. It is generally accepted that visible light is in the wavelength range of about 400 to 750 nm. In the visible wavelength range, percent transmittance plus percent absorption plus percent reflection equals 100%. For glazing units in which the substrate is untinted glass or the like, the absorption of visible wavelength light is negligible, such that the percent transmittance plus the percent reflectance can be taken as equaling 100% for the purposes of this discussion.

Referring now to FIG. 1, a cross sectional view of a motor vehicle windshield 10 is seen to comprise an exterior ply 12 laminated by a polyvinylbutyral (PVB) laminating ply 14 to a substrate ply 16. An anti-reflective coating 20 in accordance with the invention is carried on exposed surface 18 of substrate ply 16. Exterior ply 12 and substrate ply 16 each can be made of plastic or, more preferably, glass. In any event, substrate ply 16 preferably is substantially rigid and inextensible, such that the thin films making up anti-reflective coating 20 are not disrupted by stretching of substrate ply 16 during the lamination process or during the installation or use of the glazing unit.

Anti-reflective coating 20 in the preferred embodiment of FIG. 1 consists of film 22 of silicon carried directly on surface 18 of substrate ply 16. Film 24 of silicon dioxide is carried directly over silicon film 22. It will be recognized by those skilled in the art that the thicknesses of the various plys and films are not to scale. Films 22 and 24 are exaggerated for ease of illustration and better understanding. Although not necessary in all applications, an anti-reflective coating on a windshield typically will be coextensive with the inside surface thereof.

Silicon has a refractive index of approximately 3.5. As discussed above, the usefulness of silicon as the high refractive index material in a film pair intended for use as a transparent anti-reflective coating is highly surprising in view of the strong absorption of silicon in the visible wavelength region. The present invention overcomes this difficulty in part through the use of an ultra-thin film of silicon. Anti-reflective efficacy is obtained notwithstanding that the high refractive index material is so thin. It has been found that anti-reflective efficacy is achieved with an ultra-thin silicon film coupled with a film of silicon dioxide of appropriate thickness as the low refractive index material. Silicon dioxide has a refractive index of about 1.46. One preferred embodiment of the invention employs an ultra-thin silicon film having an optical path length of about 1/500 wavelength together with a silicon dioxide film thereover having an optical path length of about one-quarter to one-third wavelength. In accordance with this embodiment, excellent results have been obtained using an anti-reflective coating consisting of a 30 Angstrom thick film of silicon sputter deposited on the surface of a glass substrate and a film of silicon dioxide approximately 1,000 Angstroms thick sputter deposited directly over the silicon. While the uncoated glass exhibited approximately 8% reflection of visible wavelength light, the same glass employing such anti-reflective coating was found to have visible wavelength light reflection below 5%. The glass maintained its substantial transparency to visible light.

The silicon and silicon dioxide films of the anti-reflective coatings of the invention can be made employing equipment and techniques which are commercially available and well known to those skilled in the art. Thus, the films can be deposited onto a glass or other substrate surface by reactive sputtering and can also be deposited by electron beam coating methods. It is contemplated that increases in the thickness of the films may be achievable while still meeting a given transparency requirement by appropriately adjusting the deposition parameters or technique or by using alternative deposition methods. In general, it is an advantage of the invention that the silicon film can be deposited quickly and, hence, economically because it is so thin. Typically, the silicon film is deposited onto a surface of a ply, for example, a glass sheet, and the silicon dioxide film is deposited over the silicon film.

In one alternative method, a thicker than desired film of silicon is deposited and then heated. While not intending to be bound by theory, it is believed that a portion of the silicon is oxidized. In any event, the optical properties of the film after heating are those of a coating having a thinner silicon film. The heating improves adhesion of the coating to the glass substrate. It also improves the mechanical, and likely the chemical, durability of the film stack. It appears that this method provides a diffuse interface between the silicon and the glass substrate. According to a preferred embodiment of this coating method, a silicon film is deposited, followed by a $SiO_2$ film, on the surface of a glass ply. The coated glass ply then is heated to an elevated temperature, preferably about the bending temperature of the glass, typically at least about 1000° F., for example 1040° F. After annealing at that temperature for a time sufficient to alter the optical properties of the system, preferably at least about one hour, the glass is slowly cooled to room temperature. This procedure was applied to a coating wherein a 1500 Angstrom thick film of $SiO_2$ was deposited over a 60 Angstrom thick film of silicon on a glass substrate. After annealing at 1040° F. for one hour followed by slow cooling to room temperature, the optical properties were found to be those of a coating having a 1500 plus Angstrom thick film of $SiO_2$ over a 27 Angstrom thick film of silicon.

In a preferred method of the invention a substantially transparent laminated glazing unit is fabricated by sputtering a 5 to 50 Angstroms, most preferably about 25 Angstroms, thick silicon film onto a major surface of a substantially inextensible substrate ply. A less than 2,000 Angstroms, such as 500 to 1700 Angstroms, most preferably about 1200 Angstroms, thick silicon dioxide film is sputtered over the silicon film. The substrate ply then is laminated to another ply of glass, plastic, etc. by means of a laminating ply of PVB or other flexible polymeric material. Specifically, the laminating ply is sandwiched between the substrate ply and the additional ply and they are laminated, usually by application of heat and pressure and perhaps vacuum. Preferably the surface of the substrate ply carrying the anti-reflective coating is positioned as an exterior surface of the glazing unit closest to the viewer.

The path of incident light through a glazing unit having an anti-reflective coating in accordance with the invention is illustrated in FIG. 1. Specifically, incident light 30 strikes the surface 26 of the anti-reflective film 20 and a substantial portion thereof passes through the anti-reflective coating and the remainder of the glazing unit to exit through surface 13 of exterior ply 12 as transmitted light 32. Typically, a portion of incident light is reflected back at each interface between materials of different refractive indexes. Virtually no light is reflected back at either of the two glass/PVB interfaces 31a and 31b, because the refractive index of glass is so close to that of PVB. Normally, approximately 4% of incident light is reflected back at a glass/air interface. Thus, as noted above and as marked in FIG. 3, bare glass has a total reflectance R of about 8%, that is, 4% from each surface of the glass. In certain most preferred embodiments of the present invention, total reflectance is reduced to as low as about 4% using an anti-reflective coating on one surface. Specifically, the reflectance from the surface carrying the anti-reflective coating of the invention is reduced nearly to 0%, leaving only the 4% from the air/glass interface at the opposite glass surface. In another preferred embodiment an anti-reflective coating is employed on both surfaces and reflectance is reduced nearly to zero for the glazing unit.

This can be better understood with reference to FIG. 1. Incident light 30 strikes surface 26 of anti-reflective coating 20. Total reflectance R, expressed as a percentage of incident light 30, includes: (i) light 34 reflected at the air/SiO$_2$ interface at surface 26; (ii) light 35 reflected at the SiO$_2$/Si interface 27; (iii) light 36 reflected at the Si/glass interface at surface 18 and (iv) light 37 reflected from the glass/air interface at surface 28. As noted above, the two glass/PVB interfaces can be ignored, since the refractive index of the two materials is almost identical. The percentage passing through surface 13 is the transmittance percentage T%. Reflectance from glass surface 18 without the anti-reflective coating of the invention would be about 4%, as noted above. According to certain most preferred embodiments of the invention, such reflectance with anti-reflective coating 20 thereon, i.e., the sum of 34 plus 35 plus 36, equals approximately zero. Thus, the reflectance for the glazing unit is only about 4% in total, virtually all of that amount being contributed by reflectance 37. While substantial reflectance would have been expected at the Si/glass interface, because of the large difference in the refractive index of those materials, reflectance 36 is, in fact, essentially zero. While not intending to be bound by theory, it presently is understood that reflectance 36 is essentially zero because the ultra-thin Si film is too thin to establish an optically significant interface with the glass. As noted above, of course, it has been found nevertheless sufficient to act as the high refractive index material with SiO$_2$ in the anti-reflective film pair of the invention. It will be understood from the foregoing that an embodiment of the invention further comprising an anti-reflective coating on surface 13 of exterior glass ply 12 would have total reflectance of approximately zero.

Figure 2:
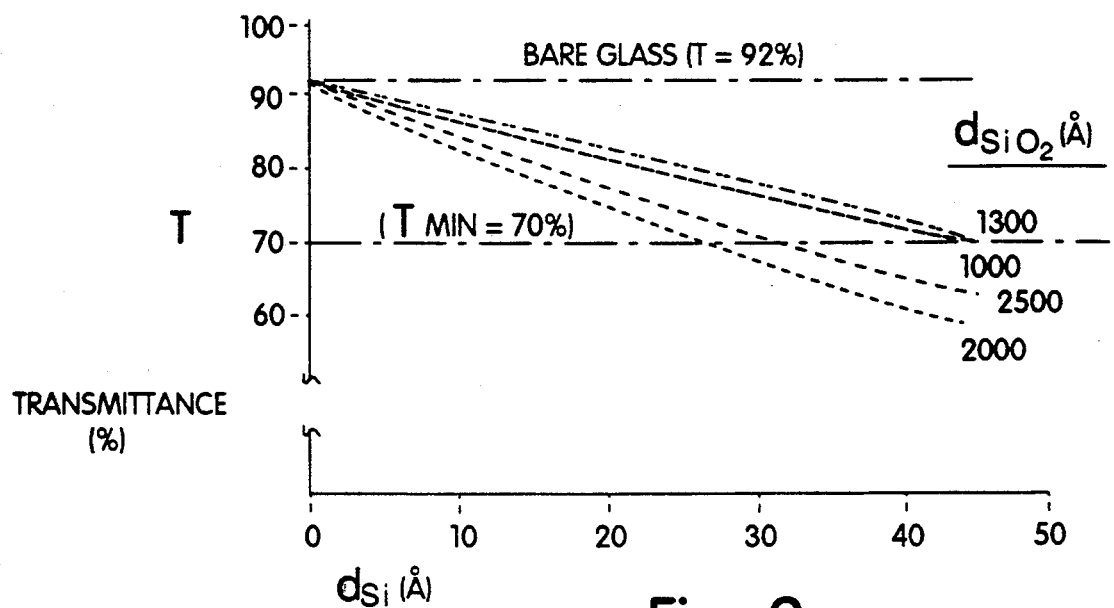
FIG. 2 is a graph showing percent transmittance of visible light through the glazing unit of FIG. 1, as a function of silicon film thickness, for several silicon dioxide film thicknesses.
Figure 3:
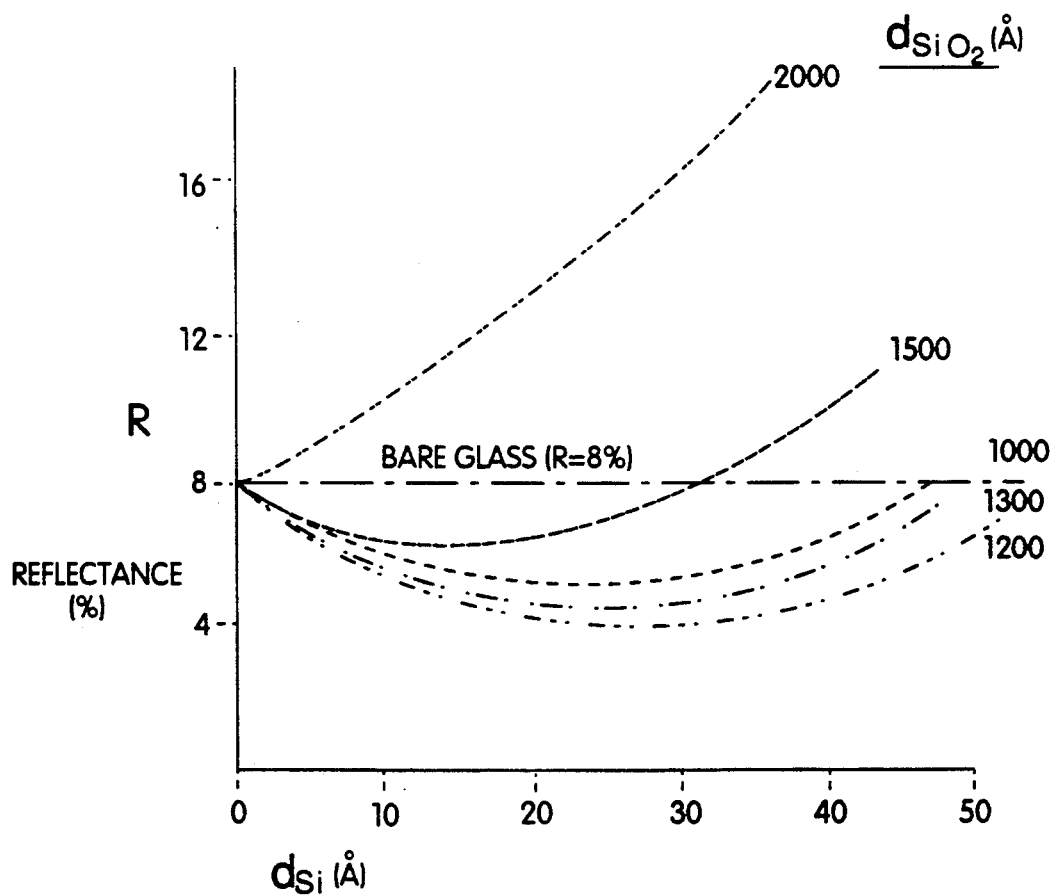
FIG. 3 is a graph showing percent reflectance of visible light from the glazing unit of FIG. 1 (i.e., from the surface bearing the anti-reflective coating of the invention), as a function of silicon film thickness, for several silicon dioxide film thicknesses.

The optical properties, specifically transmittance and reflectance, of anti-reflective coatings of the invention are shown in the graphs of FIGS. 2 and 3. Spectrophotometric reflectance (R%) and transmittance (T%) values were calculated using a computer program adapted to give integrated R and T values of UV, visible, and IR regions for a given angle of incidence on a multi-film coating over a glass substrate. Experimentally determined optical constants, the refractive index and extinction coefficient of silicon and silicon dioxide films, were used in calculating the R and T values. The computer program was provided T% and R% values for $d_{Si}$ and $d_{SiO2}$ parametric values. Plots were drawn for R as a function of $d_{Si}$ and T as a function of $d_{Si}$ for parametric thicknesses of SiO$_2$ films. These curves were used to decide the thicknesses of experimentally deposited Si and SiO$_2$ pairs providing minimum reflection with maximum transmission. The following actual pairs of Si/SiO$_2$ were sputtered from a Si target: 60/1000; 40/1000; 20/1000; 20/1200; 30/1200; 25/1200; 27/1500; 27/2000. Spectrophotometric reflectance and transmittance plots of these actual samples were obtained using a Perkin-Elmer Lambda 9 spectrophotometer. The experimental results agreed very well with values predicted by the multi-film computer program. The results shown in FIGS. 2 and 3 are for normal incidence. A similar procedure was applied to oblique incidence, including 65° which is the installation angle of a typical motor vehicle windshield (as viewed by a driver of the vehicle). The best results were obtained for a Si/SiO$_2$ film pair having a 1500 Angstrom thick SiO$_2$ film directly over a 27 Angstrom thick silicon film.

In FIG. 2 the percent transmittance of visible light is shown as a function of the thickness $d_{Si}$ of the silicon film for several different silicon dioxide film thicknesses $d_{SiO2}$. The 92% transmittance of the bare glass substrate used for the test samples is indicated in the graph. Also the 70% transmittance $T_{min}$ currently required by United States federal guidelines for motor vehicle windshields is indicated. It can be seen that transmittance falls rapidly and substantially linearly with increasing thickness of the silicon film. A silicon film of approximately 47 Angstroms thickness is still substantially transparent when used together with a silicon dioxide overfilm of 1000–1300 Angstroms thickness, preferably 1200 Angstroms. It can be seen that, in general, silicon film thickness less than about 50 Angstroms can be paired with a silicon dioxide film of appropriate thickness to render the coating substantially transparent. Preferably, the silicon is used in a range of about 5 to 50 Angstroms and the silicon dioxide film is used in the range of about 500 to 1,700 Angstroms. These thickness ranges are found to provide substantially transparent coatings having good anti-reflectance. Thinner films are generally preferred over thicker films, if performance requirements are met, since they can be deposited by sputtering or other method more quickly and, hence, are generally more economical and result in higher productivity.

Referring now to FIG. 3, the percent reflectance of the laminated glazing unit having an anti-reflective coating of the invention is shown as a function of silicon film thickness for a variety of silicon dioxide film thicknesses. The 8% reflectance of bare glass is indicated in the graph. It can be seen that a film pair coating of silicon and silicon dioxide wherein the silicon dioxide film thickness is 2000 Angstroms does not provide anti-reflectance at any silicon thickness. In fact, reflectance increases above the 8% reflectance of bare glass. Coatings of the invention preferably have silicon dioxide film thicknesses below about 1700 Angstroms. Silicon dioxide film thicknesses less than about 500 Angstroms are found to be generally inadequate to function as the low index of refraction film together with an appropriately thick silicon film. It can be seen that an anti-reflective coating having a silicon film of 20 to 30 Angstroms thickness and a silicon dioxide film of about 1200 Angstroms has reflectance of visible light as low as about 4%. A 25 Angstrom thick silicon film paired with a 1200 Angstrom thick silicon dioxide film is seen to provide such low reflectance and is a preferred embodiment of the invention. Referring back to FIG. 2, the just mentioned exemplary film pairs are seen to provide a substantially transparent glazing unit. Generally most preferred are anti-reflective coatings having a silicon film of about 10 to 40 Angstroms thickness and a silicon dioxide film thereover of about 1,000 to 1,300 Angstroms thickness.

While various exemplary and preferred embodiments of the invention have been described above, it will be apparent to those skilled in the art, in the light of this disclosure, that variations and modifications can be made without departing from the true spirit of the invention. All such variations and modifications are intended to be included within the scope of the appended claims.

We claim:

1. An anti-reflective coating comprising a silicon film and a silicon dioxide film over the silicon film, the anti-reflective coating being substantially transparent to visible light.

2. The anti-reflective coating of claim 1 wherein the silicon film is less than about 50 Angstroms thick and the silicon dioxide film is less than about 2000 Angstroms thick.

3. The anti-reflective coating of claim 1 wherein the silicon film has a thickness between about 5 and 50 Angstroms and the silicon dioxide film is directly over the silicon film and has a thickness between about 500 and 1700 Angstroms.

4. An anti-reflective coating comprising a silicon film having a thickness between about 10 and 40 Angstroms and a silicon dioxide film directly over the silicon film having a thickness between about 1000 and 1300 Angstroms, the anti-reflective coating having at least about 70% transmittance and less than about 8% reflectance of visible light incident on the anti-reflective coating.

5. A glazing unit comprising a substrate and an anti-reflective coating which is substantially transparent to visible light on a surface of the substrate, the anti-reflective coating comprising a silicon film and a silicon. dioxide film over the silicon film.

6. The glazing unit of claim 5 wherein the anti-reflective coating is on a major exterior surface of the substrate, the silicon film is on the substrate surface and is less than about 50 Angstroms thick, and the silicon dioxide film is directly over the silicon film and is less than about 2000 Angstroms thick.

7. The glazing unit of claim 5 wherein the silicon film has a thickness between about 5 and 50 Angstroms and the silicon dioxide film is directly over the silicon film and has a thickness between about 500 and 1700 Angstroms.

8. The glazing unit of claim 5 further comprising an anti-reflective film on a second surface of the substrate substantially opposite the first surface.

9. A glazing unit comprising a substrate and an anti-reflective coating on a surface of the substrate, the anti-reflective coating comprising a silicon film directly on the surface of the substrate and having a thickness between 10 and 40 Angstroms, and a silicon dioxide film directly over the silicon film and having a thickness between about 1000 and 1300 Angstroms, the glazing unit having at least about 70% transmittance, and less than about 8% reflectance of visible light.

10. A laminated glazing unit comprising an exterior ply, a substantially inextensible substrate ply laminated to the exterior ply by a laminating layer of flexible polymeric material, and an anti-reflective coating on a major exterior surface of the substrate ply, the anti-reflective coating comprising a silicon film directly on the surface of the substrate ply and a silicon dioxide film directly over the silicon film, the laminated glazing unit being substantially transparent to visible light.

11. The laminated glazing unit of claim 10 wherein the exterior and substrate plys each is glass and the laminating ply is polyvinylbutyral.

12. The laminated glazing unit of claim 10 wherein the silicon film has a thickness between about 5 and 50 Angstroms, the silicon dioxide film has a thickness between about 500 and 1700 Angstroms and the glazing unit has above about 70% transmittance and 8% reflectance of visible light incident on the anti-reflective coating.

13. The laminated glazing unit of claim 12 wherein the silicon film is about 30 Angstroms thick and the silicon dioxide film is about 1000 Angstroms thick.

* * * * *